(12) United States Patent
Krohn et al.

(10) Patent No.: US 6,534,763 B2
(45) Date of Patent: Mar. 18, 2003

(54) LOW MAINTENANCE LINE SCAN CAMERA

(75) Inventors: Robert M. Krohn, Vestal, NY (US); Glenn L. Kehley, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 22 days.

(21) Appl. No.: 09/810,397

(22) Filed: Mar. 19, 2001

(65) Prior Publication Data

US 2002/0130257 A1 Sep. 19, 2002

(51) Int. Cl.[7] .................................................. H01J 40/14
(52) U.S. Cl. .................... 250/239; 250/208.1; 359/819; 382/101
(58) Field of Search ............................. 250/239, 208.1, 250/216, 235, 237 R, 559.08; 359/819, 811, 827; 382/101; 358/483, 482, 474; 235/462.43, 462.41

(56) References Cited

U.S. PATENT DOCUMENTS

| | | | |
|---|---|---|---|
| 4,088,396 A | * | 5/1978 | Edelstein .................... 359/822 |
| 5,530,547 A | * | 6/1996 | Arnold ........................ 356/458 |
| 5,567,934 A | | 10/1996 | Zheng et al. |
| 5,650,615 A | | 7/1997 | Buzzelli |
| 5,661,297 A | | 8/1997 | Aleshire et al. |
| 5,737,132 A | * | 4/1998 | Luecke et al. .............. 359/819 |
| 5,822,455 A | | 10/1998 | Sano et al. |
| 5,883,386 A | | 3/1999 | Tsuyuki et al. |
| 5,936,239 A | | 8/1999 | Tsai et al. |
| 5,986,253 A | | 11/1999 | Tabata |
| 6,198,580 B1 | * | 3/2001 | Dallakian ................... 359/822 |

* cited by examiner

*Primary Examiner*—Kevin Pyo
*Assistant Examiner*—Seung C. Sohn
(74) *Attorney, Agent, or Firm*—Schwartz & Weinreib (57) ABSTRACT

A line scan camera comprises a printed circuit board upon which a charge-coupled device (CCD) is mounted. A lens component is fixed within a lens mount, and the base of the lens mount is adjustably mounted upon an optical bench. Calibration devices adjustably interconnect the lens mount to the printed circuit board and to the optical bench so as to calibrate the positional location of the lens component relative to the charge-coupled device (CCD) and to an object plane past which objects to be scanned and photographed are conveyed. In this manner, the focus distance defined between the lens component and the charge-coupled device (CCD) as well as the focal distance defined between the lens component and the object plane are fixed and do not need any further calibration. The object plane is defined upon the front surface of a sealed housing enclosure and all of the components are disposed within the housing enclosure so as to prevent dust and contaminants from collecting upon the optical components. LED arrays are disposed within the front of the housing so as to illuminate and properly expose the objects conveyed past the object plane. A positive pressure differential is also created within the sealed housing enclosure so as to prevent the ingress of dust and contaminants into the housing enclosure.

26 Claims, 8 Drawing Sheets

LOW MAINTENANCE LINE SCAN CAMERA

FIELD OF THE INVENTION

The present invention relates generally to line scan cameras, and more particularly to a new and improved line scan camera which comprises a sealed camera structure or entity wherein an optical assembly, which comprises or includes a lens and CCD subassembly, and an optical bench assembly, which comprises or includes the focal point or object plane, are integrated together such that once the optical assembly is calibrated and locked in position with respect to the optical bench assembly by means of highly skilled factory technicians, further calibration or recalibration of the optical assembly, or more particularly, the lens and CCD components, with respect to each other as well as with respect to the optical bench assembly, or more particularly, with respect to the object plane, is no longer required. In addition, dust and other contaminants are effectively substantially prevented from entering the sealed camera structure so as not to collect upon the optical components of the camera whereby substantial maintenance or cleaning of the optical components of the camera is not usually required. Should routine maintenance or cleaning of the optical components of the camera nevertheless be required, such routine maintenance or cleaning of the optical components of the camera, and reassembly of the entire sealed camera structure, can be rapidly performed, with minimal operational downtime of the camera, due to the fact that recalibration of the optical assembly, with respect to the optical bench assembly, is obviated despite the fact that the various optical components of the camera were operatively disassembled with respect to each other.

BACKGROUND OF THE INVENTION

Line scan cameras are used in various industrial or commercial applications, such as, for example, in those instances or circumstances wherein the camera is maintained stationary while the objects to be photographed or scanned are moved with respect to the camera. One such exemplary industrial or commercial application comprises the use of line scan cameras in connection with the high-speed sorting or processing of mail. In accordance with such systems, for example, pieces of mail are conveyed past a point or object plane at which the line scan camera scans or photographs the same. In order to achieve the necessary high-speed scanning or photographing of the mail so as to, in turn, ensure the high-speed processing or sorting of the millions of pieces of mail which enter the mail or postal system on a daily basis, it can be readily appreciated that relatively simple, accurate, high-speed, and reliable line scan cameras, devices, or systems are required. Prior art or conventional line scan cameras, or similar devices or systems, are exemplified by the devices or systems which are disclosed, for example, within U.S. Pat. No. 5,986,253 which issued to Tabata on Nov. 16, 1999, U.S. Pat. 5,936,239 which issued to Tsai et al. on Aug. 10, 1999, U.S. Pat. No. 5,883,386 which issued to Tsuyuki et al. on Mar. 16, 1999, and U.S. Pat. No. 5,661,297 which issued to Aleshire et al. on Aug. 26, 1997. While these prior art line scan cameras, or devices or systems, have ostensibly been satisfactory in connection with their operability and the performance of their desired objectives, it has been realized that none of such prior art cameras, or devices or systems, are capable of achieving, for example, the aforenoted objectives or operational characteristics of simplicity, accuracy, and reliability required in connection with line scan camera units which are to be utilized within high-speed scanning or processing systems, such as, for example, the sorting or processing of postal mail.

More particularly, in connection with a line scan camera which is to be used to perform, for example, high-speed processing or sorting of postal mail, it has been noted that the camera should be simple, accurate, and reliable. In order to achieve simplicity in connection with the camera structure, for example, it is desirable that the lens have in effect a fixed focal point with respect to the object plane such that the lens need not be refocused each time an object is to be scanned or photographed, or even periodically after repair operations have been completed. Similarly, it is desirable that the camera have its own self-contained illumination system such that exposure adjustments also need not be required each time an object is to be scanned or photographed. In a similar manner, in order to provide the camera with the requisite degree of accuracy, it is desirable to provide the same with a positional calibration system whereby once the lens structure or assembly is positionally calibrated with respect to the object plane so as to fix the focal point, as well as being positionally calibrated with respect to the CCD or charge-coupled device so as to fix the focusing length, positional recalibration of the lens structure or assembly would no longer be required. Such a structural system would therefore obviate currently required setup and calibration procedures by highly skilled technicians and significantly reduce implementation or operational times conventionally required when line scan cameras presently in use are to be used at their field locations.

Still further, it is also noted that line scan cameras which are used, for example, to sort or process postal mail are necessarily subjected to dust and other contaminants which, when collected upon the various optical components of the cameras, compromise or significantly reduce the optical performance of the cameras. In order to rectify this situation, the cameras need to be periodically cleaned or maintained. Such cleaning and maintenance operations or procedures, however, are quite time-consuming, they require skilled technicians to perform such operations or procedures, and in addition, result in significant additional operational downtime of the cameras since the cameras, in addition to the performance of the required cleaning and maintenance operations or procedures, also need to have the lens components positionally recalibrated when the various camera components, which were disassembled in order to perform the cleaning and maintenanced procedures, are to be reassembled with respect to each other.

A need therefore exists in the art for a new and improved line scan camera which is simple in its structural make-up such that, for example, focusing adjustments of the lens assembly with respect to the object plane, as well as exposure adjustments with respect to the object being illuminated and photographed, need not be performed; wherein the positional adjustments for the lens assembly with respect to the object plane and the CCD or charge-coupled device are able to be fixed such that the positional adjustments of the lens assembly with respect to the object plane and the CCD or charge-coupled device need not be recalibrated; and wherein all of the optical components of the line scan camera are disposed within a sealed enclosure such that dust and contaminants attendant the operational usage of the camera are effectively prevented from collecting upon the optical components of the camera such that frequent cleaning, maintenance, and repair of the camera, with comcomitant downtime of the camera system, is effectively reduced or obviated.

OBJECTS OF THE INVENTION

Accordingly, it is an object of the present invention to provide a new and improved line scan camera which has particular utility in connection with the scanning or photographing of pieces of mail attendant the high-speed processing or sorting of postal mail.

It is also an object of the present invention to provide a new and improved line scan camera which overcomes the various operational drawbacks and disadvantages characteristic of prior art line scan cameras or similar devices or systems.

Another object of the present invention is to provide a new and improved line scan camera wherein the optical components of the optical assembly of the camera are able to be positionally calibrated relative to the charge-coupled device (CCD) and the object plane of the optical bench such that the optical components need not be recalibrated despite shocks or movement of the camera attendant its normal operations, or even if the camera components are disassembled for the performance of maintenance, cleaning, replacement or repair operations or procedures.

An additional object of the present invention is to provide a new and improved line scan camera wherein the lens structure of the optical assembly of the camera is relatively simple, and the camera is provided with a self-contained illumination system, such that focusing and exposure adjustments need not be performed upon the camera.

A further object of the present invention is to provide a new and improved line scan camera wherein all of the optical components thereof are effectively enclosed within a sealed structure such that dust and other contaminants cannot collect upon and foul the optical components whereby frequent cleaning or maintenance of the optical components of the camera are obviated or significantly reduced.

SUMMARY OF THE INVENTION

The foregoing and other objectives are achieved in accordance with the teachings and principles of the present invention through the provision of a new and improved line scan camera which comprises an optical assembly and an optical bench. The optical assembly comprises a printed circuit board upon which is mounted a charge-coupled device (CCD), and a lens assembly which is positionally adjusted or calibrated with respect to the printed circuit board and the charge-coupled device (CCD) such that once the lens assembly is fixed with respect to the printed circuit board and the charge-coupled device (CCD), the focus distance or focus point from the lens to the charge-coupled device (CCD) is fixed. The optical bench comprises an aperture which defines an object plane, and in addition, has a stop block fixedly mounted thereon. The stop block is provided with a plurality of registration surfaces, and the optical assembly is provided with a plurality of set screws which are adapted to be adjusted or calibrated with respect to the registration surfaces of the stop block. When the set screws are properly adjusted or calibrated and fixed in position, the optical assembly is then fixed in position upon the optical bench. In this manner, the lens assembly of the optical assembly is in effect fixed with respect to the object plane of the optical bench such that the focal point or focal distance defined between the lens assembly and the aperture or object plane is fixed. Accordingly, focusing or refocusing of the lens assembly for each or subsequent scanning or photographing operation need not be performed. Similarly, should the optical assembly be disassembled with respect to the optical bench, such as, for example, for the performance of cleaning or maintenance operations, or should the optical assembly need to be replaced with a similarly adjusted or calibrated optical assembly, recalibration of the optical assembly with respect to the optical bench does not have to be performed. It is also noted that all components of the camera are enclosed within a sealed housing structure so as to prevent the ingress of dust or other contaminants into the interior of the housing whereby fouling of the optical components is effectively prevented or substantially reduced, and the forward part of the housing structure is also provided with a self-contained illumination system so as to always adequately illuminate the object plane and the objects being passed across the aperture during a scanning or photographing process. Accordingly, no exposure adjustments are required to be performed.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Referring now to the drawings, and more particularly to FIGS. 1–5 thereof, the new and improved line scan camera constructed in accordance with the principles and teachings of the present invention is disclosed and is generally indicated by the reference character 10. The line scan camera 10 is seen to comprise a base or optical bench 12 upon which a sealed housing structure or enclosure 14 is able to be fixed by suitable means, not all of which are shown. More particularly, the housing structure or enclosure 14 is seen to comprise a front housing section 16, a rear housing section 18, and an intermediate or central housing section 20. The rear housing section 18 is seen to comprise a vertical rear wall 22 which projects or extends upwardly from the rear edge portion of the base or optical bench 12. Each opposite side edge portion 24,26 of the rear wall 22 is respectively provided with a forwardly open vertical slot 28, 30, and opposite side edge portions 32,34 of the base or optical bench 12 are respectively provided with grooves or slots 36,38 which are defined within the upper surface of the base or optical bench 12 and extend parallel to the side edge portions 32,34 of the base or optical bench 12. In a similar manner, the central portion of the base or optical bench 12 is also provided with a pair of laterally spaced grooves or slots 40,42 which are oriented transversely so as to extend substantially perpendicular to the grooves or slots 36,38 at their respective forward ends.

Figure 3:
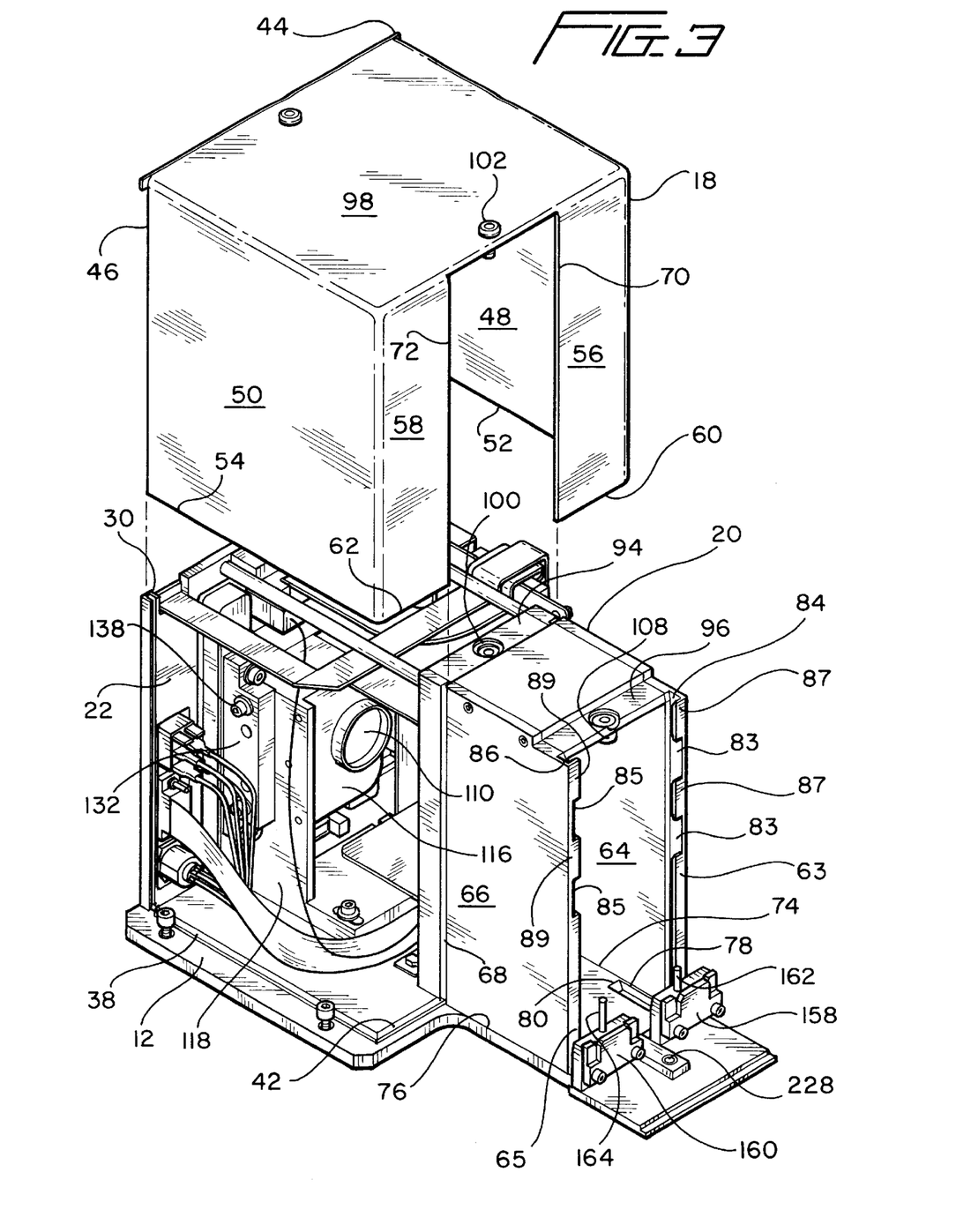
FIG. 3 is a partially exploded, left side, front perspective view of the new and improved line scan camera constructed in accordance with the principles and teachings of the present invention and corresponding to the partially exploded, left side, front perspective view of FIG. 1 wherein, however, the front housing section is not illustrated and the rear housing section has been removed so as to illustrate the lens assembly as disposed within the interior of the rear housing section.

As can best be appreciated from FIG. 3, when the rear housing section 18 is to be seated and mounted upon the base or optical bench 12, rear edge portions 44,46 of opposite side walls 48,50 are inserted within the slots 28,30 of the rear wall 22 while lower edge portions 52,54 of the side walls 48,50 are adapted to be disposed within the grooves or slots 36,38 of the base or optical bench 12. It is also seen that the rear housing 18 comprises a pair of laterally separated front wall sections 56,58. Accordingly, in a similar manner, when the rear housing section 18 is to be seated and mounted upon the base or optical bench 12, lower edge portions 60,62 of the front wall sections 56,58 will be disposed within the transversely disposed slots or grooves 40,42 defined within the upper surface of the base or optical bench 12. Still further, it is also seen that the intermediate or central housing section 20 comprises a pair of side walls 64,66, and within a rearward portion of each one of the side walls 64,66, there is provided a vertically extending slot or groove 68,68, only one of which, 68, is visible and illustrated within the side wall 66. Accordingly, it can be readily understood that when the rear housing section 18 is to be seated and mounted upon the base or optical bench 12, oppositely disposed, vertically extending inward edge portions 70,72 of the front wall sections 56,58 of the rear housing section 18 will be disposed and accommodated within the vertically extending slots or grooves 68,68 of the central or intermediate housing section side walls 64,66.

It is to be further understood that, as is illustrated in FIG. 3, when the housing sections 16,18,20 are to be seated and mounted upon the base or optical bench 12, the central or intermediate housing section 20 is preferably the first housing section to be mounted upon the base or optical bench 12. In order to seat or mount the central or intermediate housing section 20 upon the base or optical bench 12, each one of the lower edge portions 74,76 of the intermediate housing section side walls 64,66 is provided with a downwardly projecting tab member, detent, or the like 78,78 at the forward end portions thereof, only one of which is illustrated, for example, within FIG. 3 in connection with the side wall 64, and a forward end portion of the base or optical bench 12 is provided with a pair of laterally spaced apertures or slots 80,82 within which the tab members or detents 78,78 are adapted to be snap-fitted. It is further seen that the forward edge portions 63,65 of the side walls 64,66 of the central or intermediate housing section 20 have vertically extending slots or grooves 84,86 defined therein as well as a pair of vertically spaced notched portions 83, 85 and a pair of vertically spaced tab members 87,89. As can best be appreciated from FIG. 2, vertically extending side edge portions 88,90 of a vertical wall member 92, which is rearwardly offset from a back wall member 93 of the forward housing section 16, are adapted to be disposed or accommodated within the vertically extending grooves or slots 84, 86. The side edge portions 88,90 of vertical wall member 92, in a manner similar to that of edge portions 63,65, are likewise provided with a pair of vertically spaced notched portions 91,93 and a pair of vertically spaced tab members 95,97.

In this manner, when the forward housing section 16 is to be mounted upon the intermediate housing section 20, the tab members 95,97 of the forward housing section 16 will be aligned with the notched portions 83,85 of the intermediate housing section 20, as will the tab members 87,89 of the intermediate housing section 20 with respect to the notched portions 91,93 of the forward housing section 16, and subsequently, the forward housing section 16 can be lowered with respect to the intermediate housing section 20 so as to be disposed in its mounted position. When it is desired to remove the forward housing section 16 from the intermediate housing section 20, the reverse process is performed, however, it is noted that the forward housing section 16 need not be raised or elevated to such an extent as to vertically clear or be entirely disposed above the intermediate housing section 20, but need only be raised or elevated until the respective tab members 87,89,95,97 and notched portions 83,85,91,93 are again in proper alignment with respect to each other whereby the forward housing section 16 can be moved forwardly away from the intermediate housing section 20. In this manner, if the camera 10 is disposed within limited or restricted spatial areas of a facility, the forward housing section 16 can nevertheless be disassembled from the remaining camera structure.

Figure 1:
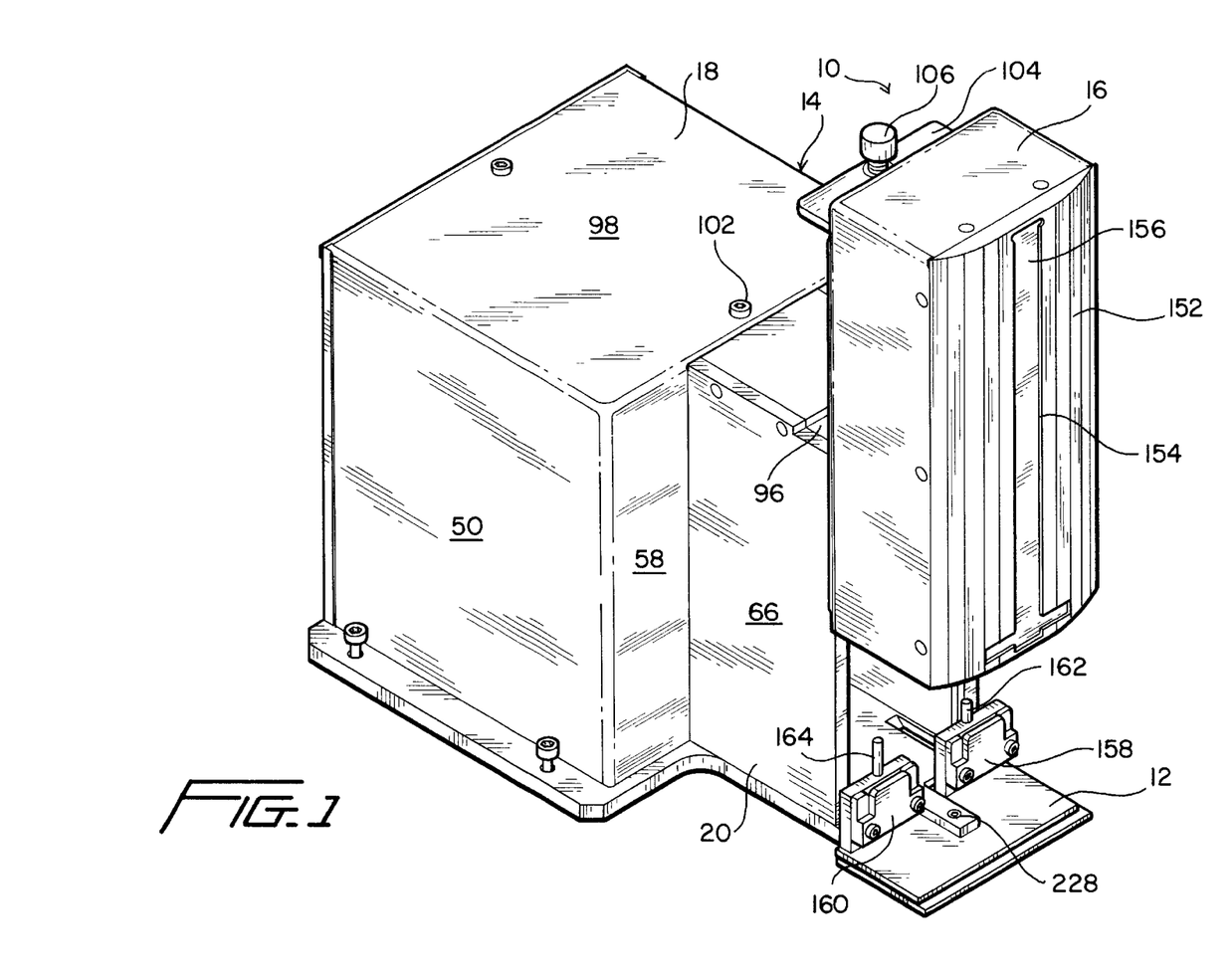
FIG. 1 is a partially exploded, left side, front perspective view of the new and improved line scan camera constructed in accordance with the principles and teachings of the present invention and showing in particular the three primary housing sections defining the overall housing enclosure.
Figure 2:
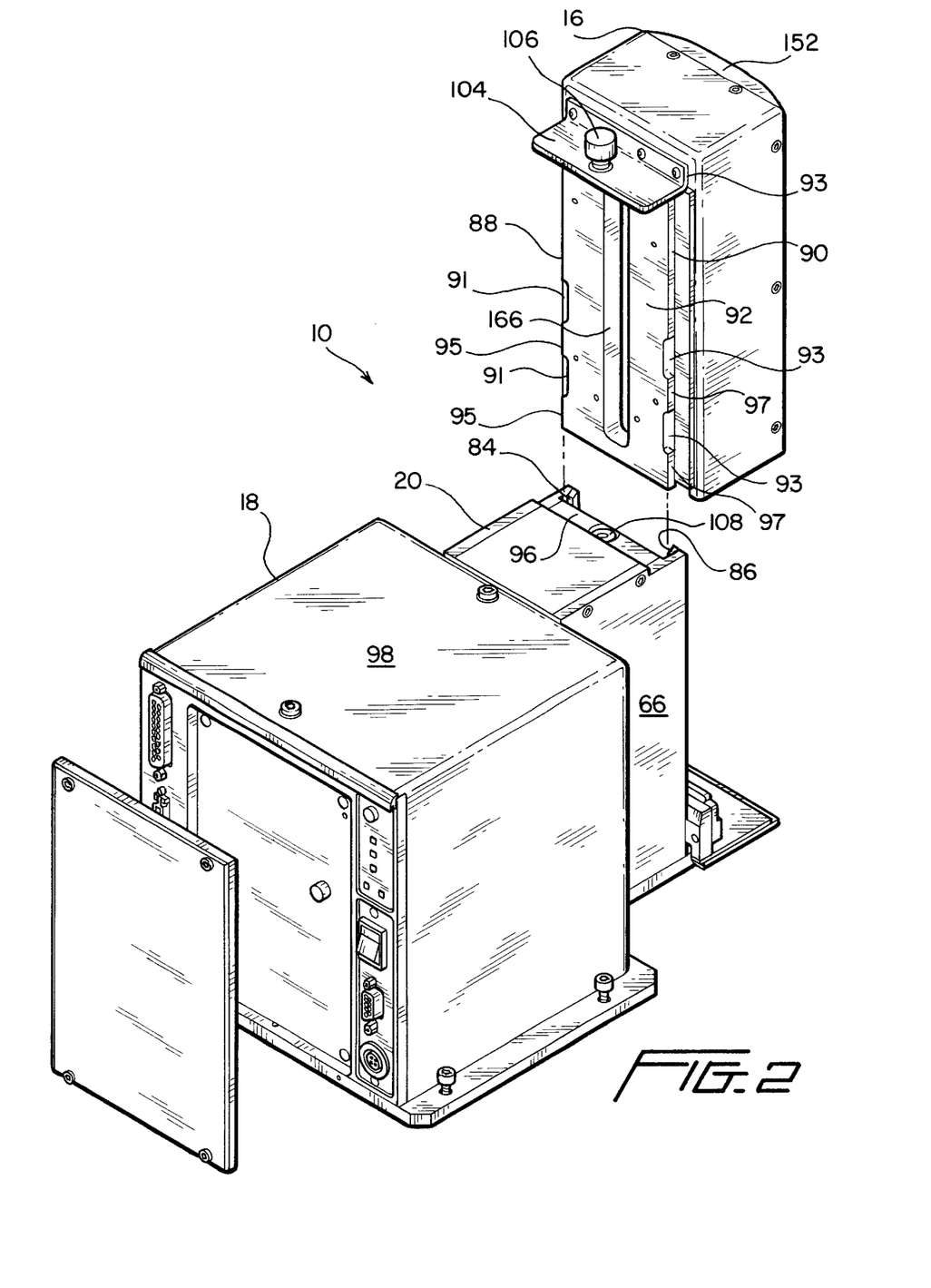
FIG. 2 is a partially exploded, left side, rear perspective view of the new and improved line scan camera constructed in accordance with the principles and teachings of the present invention and corresponding to the partially exploded, left side, front perspective view of FIG. 1.

In order to further secure the three housing sections 16,18,20 together, it is further noted that as best seen in FIG. 3, the upper surface portion of the central or intermediate housing section 20 has a stepped configuration and in particular is seen to have a rearward vertically recessed stepped or ledge portion 94 and a forward vertically recessed stepped or ledge portion 96. Accordingly, as can be appreciated from FIGS. 1 and 3, when the rear housing section 18 is fully mounted or seated upon the base or optical bench 12, a central forward edge portion of the upper or top wall 98 of the rear housing section 18, which in effect is located between the laterally spaced front wall sections 56,58, will be seated upon the rearward ledge portion 94 of the central or intermediate housing section 20. In order to fixedly secure the housing sections 18 and 20 together, the rearward ledge portion 94 of the housing section 20 is provided with, for example, a threaded nut or the like 100 fixedly mounted therein, while the central forward edge portion of the top wall 98 of the housing section 18 is correspondingly provided with a threaded bolt 102 or the like for threaded mating with the nut 100. In a similar manner, as best seen in FIGS. 1 and 2, a mounting bracket 104 is mounted upon an upper portion of the back wall 93 of the front housing section 16, and a threaded bolt or the like 106 is mounted upon the bracket 104. The forward ledge portion 96 of the central or intermediate housing section 20 is provided with a threaded nut member 108, and accordingly, when the front housing section 16 is mounted upon the base or optical bench 12, mounting bracket 104 will be seated upon the forward ledge portion 96 of the housing section 20 whereupon threaded engagement of the bolt fastener 106 with the nut member 108, front and central housing sections 16 and 18 are fixedly secured together. As a result of the aforenoted sealed housing or enclosure 14, comprising the three housing sections 16,18,20 secured together and mounted upon the base or optical bench 12, it can be appreciated that dust and other contaminants are effectively prevented from entering or being able to ingress into the interior of the housing or enclosure 14 so as not to contaminate or foul the various optical components disposed internally within the housing or enclosure 14. Accordingly, frequent maintenance, cleaning operations, or the like, need not be performed upon the new and improved camera 10 of the present invention.

Having now described the overall housing or enclosure structure 14 of the line scan camera 10 of the present invention, the internal optical components of the line scan camera 10 of the present invention will now be described. With reference therefore now being primarily made to FIGS. 4–8, the line scan camera 10 of the present invention is seen to further comprise a lens assembly which is generally indicated by the reference character 109 and which comprises a lens component 110 which is encased within an externally threaded housing 112 as best seen in FIG. 6. The lens housing 112 is adapted to be threadedly mounted within an internally threaded bore 114 formed within a lens mount 116, and it is seen that the lens mount 116 is integrally mounted upon a vertically disposed lens assembly side wall 118 while the lens assembly side wall 118 is integrally attached at its lower end portion to a lens assembly base 120. It is to be particularly noted that when the lens housing 112 is to be mounted within the lens mount 116, it is fully threadedly engaged within the threaded bore 114 such that once the lens housing 112 is fully threadedly engaged within the threaded bore 114, no further or additional positional adjustments of the lens component 110 with respect to the lens mount 116 need to be performed. However, as can readily be appreciated by those skilled in the art, the lens component 110 needs to be positionally adjusted with respect to both the charge-coupled device (CCD) so as to define, in effect, the focus point or focus distance, and with respect to the object or focal plane so as to define, in effect, the focal point or focal distance. In addition to focus parameters, positional adjustments that impact the projection of an image onto the charge-coupled device (CCD) are also accomplished.

Figures 7, 8A:
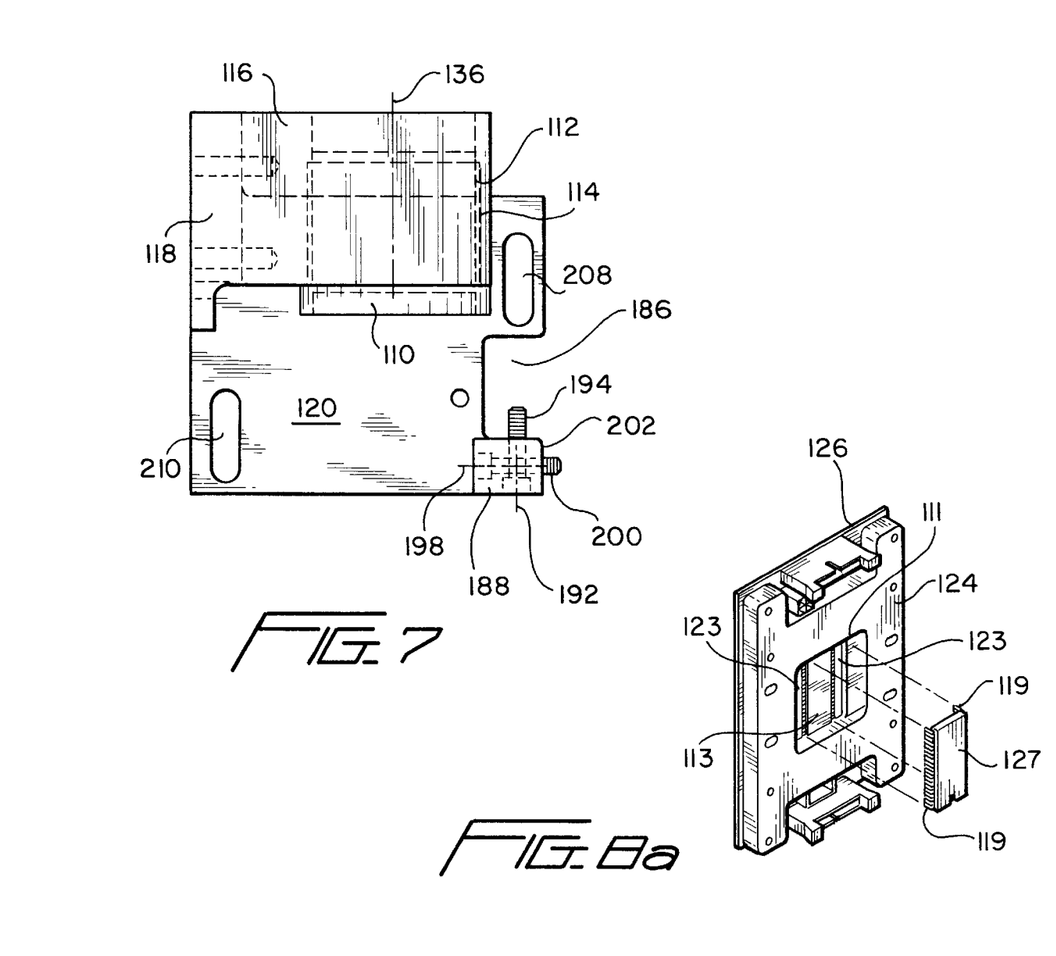
FIG. 7 is a top plan view of the lens assembly as shown in FIG. 6.
FIG. 8a is a partially exploded perspective view showing the mounting of the charge-coupled device (CCD) upon the heat sink and printed circuit board components of the line scan camera.
Figure 8:
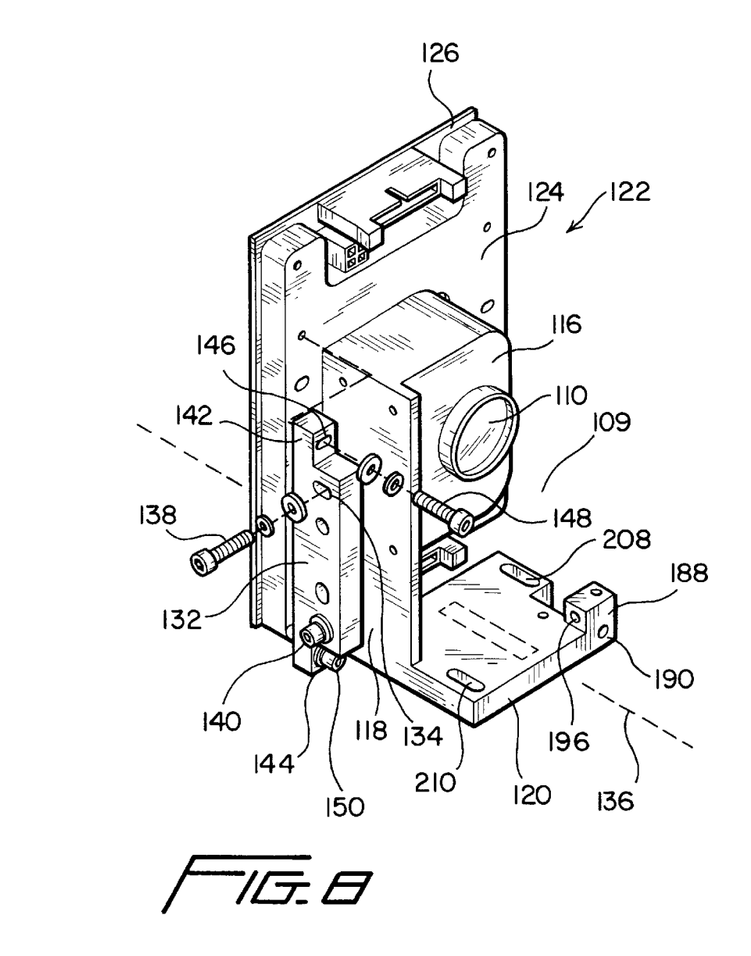
FIG. 8 is a partially exploded, left side, front perspective view of the optical assembly of the new and improved line scan camera constructed in accordance with the principles and teachings of the present invention.

More particularly, with specific reference being made to FIG. 8, there is disclosed an optical assembly which is generally indicated by the reference character 122 and it is seen that the optical assembly 122 comprises the lens assembly 109. In addition, the optical assembly 122 also comprises a metal heat sink 124 upon which there is fixedly mounted a printed circuit board 126, and the printed circuit board 126 has a charge-coupled device (CCD) 127 operatively connected thereto as best seen from FIGS. 8a and 8b. More particularly, the heat sink 124 is provided with a substantially square-shaped apertured section 111 at the central portion thereof, and a vertically extending bridge member 113 connects upper and lower frame portions of the heat sink 124 which define the central apertured section 111 such that the bridge member 113 in effect forms a seat upon which the charge-coupled device (CCD) or chip 127 can be mounted. When mounting the device or chip 127 upon the bridge member 113 of the heat sink 124, a suitable viscous, heat conductive liquid is applied to the bridge member 113, and when the charge-coupled device (CCD) or chip 127 is mounted thereon, the viscous material is uniformly spread across the entire undersurface or back side of device or chip 127. As a result of such an assembly, operational heat generated by the charge-coupled device (CCD) or chip 127 is transferred away from the chip 127 and dissipated to the heat sink 124 whereby such heat can be further dissipated to the ambient environment. By maintaining the charge-coupled device (CCD) or chip 127 relatively cool, its service life is extended whereby frequent replacement maintenance is obviated.

Figure 8B:
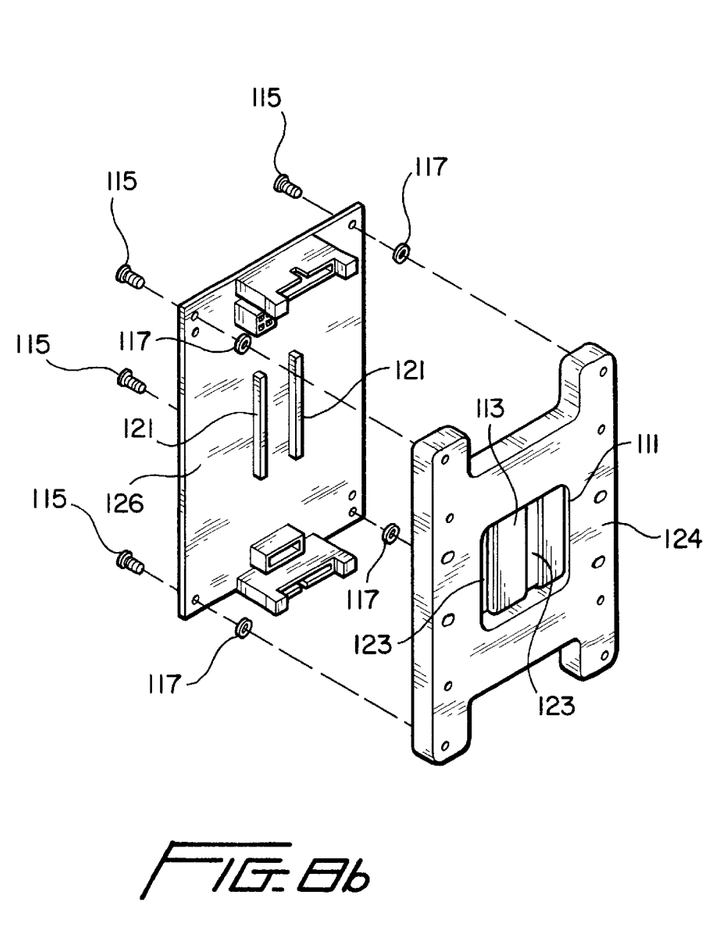
FIG. 8b is an exploded perspective view showing the heat sink and printed circuit board components of the line scan camera prior to their connection together.
Figure 9:
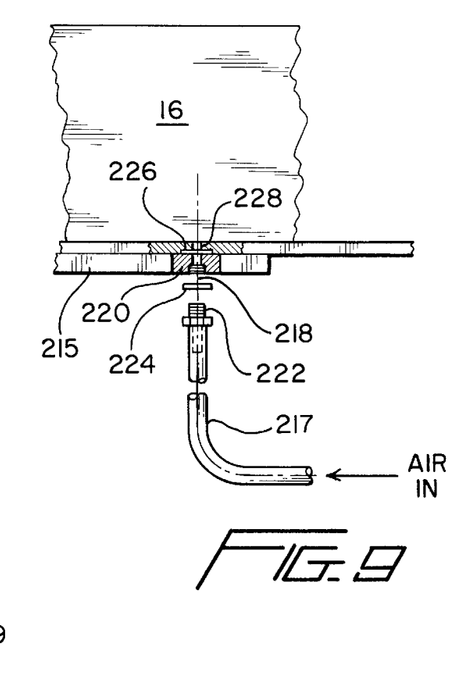
FIG. 9 is a partial cross-sectional view showing the connection of the air line to the mounting plate and base plate components of the line scan camera so as to introduce low pressure air into the interior of the line scan camera.

In order to complete the heat sink-printed circuit board assembly, it is seen that the heat sink 124 has a substantially H-shaped configuration, and that a plurality of fasteners 115 connect corner portions of the printed circuit board 126 to corner portions of the H-shaped heat sink 124. Spacers 117 are interposed between the corner regions of the printed circuit board 126 and the heat sink 124 in order to maintain the printed circuit board 126 and heat sink 124 properly spaced from each other so as to thereby properly accommodate the laterally spaced vertical arrays of pins 119 of the chip or charge-coupled device (CCD) 127 which are adapted to be operatively connected to similarly disposed arrays of pin socket members 121 mounted upon the printed circuit board 126. In order to permit the pin arrays 119 of the charge-coupled device (CCD) or chip 127 to mate with the pin socket members 121, vertically extending apertures 123 are effectively formed upon opposite sides of the bridge member 113 of the heat sink 124 so as to permit the pin arrays 119 to project therethrough when the charge-coupled device (CCD) or chip 127 is mounted or seated upon the bridge member 113.

As noted hereinbefore, the lens component 110 needs to be positionally adjusted with respect to the chip or charge-coupled device (CCD) 127, or in effect, since the charge-coupled device (CCD) 127 is operatively mounted upon the printed circuit board 126, the lens component 110 needs to be positionally adjusted with respect to the printed circuit board 126 so as to effectively be positionally adjusted with respect to the charge-coupled device (CCD) 127. In order to achieve such positional adjustment or calibration of the lens component 110 with respect to the printed circuit board 126, and since the printed circuit board 126 is mounted upon the metal heat sink 124, the lens mount 116 must be mounted in a positionally adjustable manner with respect to or upon the metal heat sink 124. Accordingly, as best seen from FIG. 6, the side wall 118 of the lens assembly 109 is pro-vided with, for example, a pair of vertically spaced inter-nally threaded apertures or bores 128,130, and as best seen in FIGS. 3 and 8, a lens assem-bly mounting bracket 132 is adapted to fixedly interconnect the lens mount 116, through means of the lens assembly side wall 118, to the metal heat sink 124. More particularly, the lens assembly mounting bracket 132 is provided with a pair of vertically spaced oval-shaped apertures or through-bores 134, only one of which is shown in FIG. 8, wherein the axes of the apertures or through-bores 134 are disposed transversely with respect to the longitudinal axis 136 of the optical assembly 122, and it is to be appreciated that the mounting bracket 132 is mounted upon the lens assembly side wall 118 as a result of a pair of threaded bolts 138,140 being inserted into and through the apertures or through-bores 134 so as to threadedly engage the threaded bores 128,130 defined within the lens assembly side wall 118. The provision of the apertures or through-bores 134 with their oval configurations permits the angular disposition of the mounting bracket 132 and the lens assembly 109 to be angularly adjusted with respect to the metal heat sink 124 about or around an axis which is disposed perpendicular to the axis 136 of the optical assembly 122 as will be discussed further hereinafter.

In a similar manner, the mounting bracket 132 is further provided with a pair of vertically spaced upper and lower lugs or ears 142,144 each of which is provided with an oval or elliptically shaped aperture or through-bore 146, only one of which is shown in FIG. 8, wherein the axes of the apertures or through-bores 146 extend parallel to the axis 136 of the optical assembly 122. The metal heat sink 124 is accordingly provided with a plurality of threaded bores, not visible, and a pair of threaded bolt fasteners 148,150 are adapted to be inserted through the apertures or through-bores 146 defined within the lugs or ears 142,144 of the mounting bracket 132 such that when the bolt fasteners 148,150 are threadedly engaged within the threaded bores, not shown, defined within the metal heat sink 124, the mounting bracket 132 will be fixedly connected to the metal heat sink 124 so as to thereby fixedly interconnect the metal heat sink 124 and the lens assembly 109. As was the case with the apertures or through-bores 134, the provision of the apertures or through-bores 146 with their oval configurations permits the angular disposition of the mounting bracket 132 and the lens assembly 109 to be angularly adjusted with respect to the metal heat sink 124 about or around an axis which is disposed parallel to the axis 136 of the optical assembly 122 as will be discussed further hereinafter.

Figure 3A:
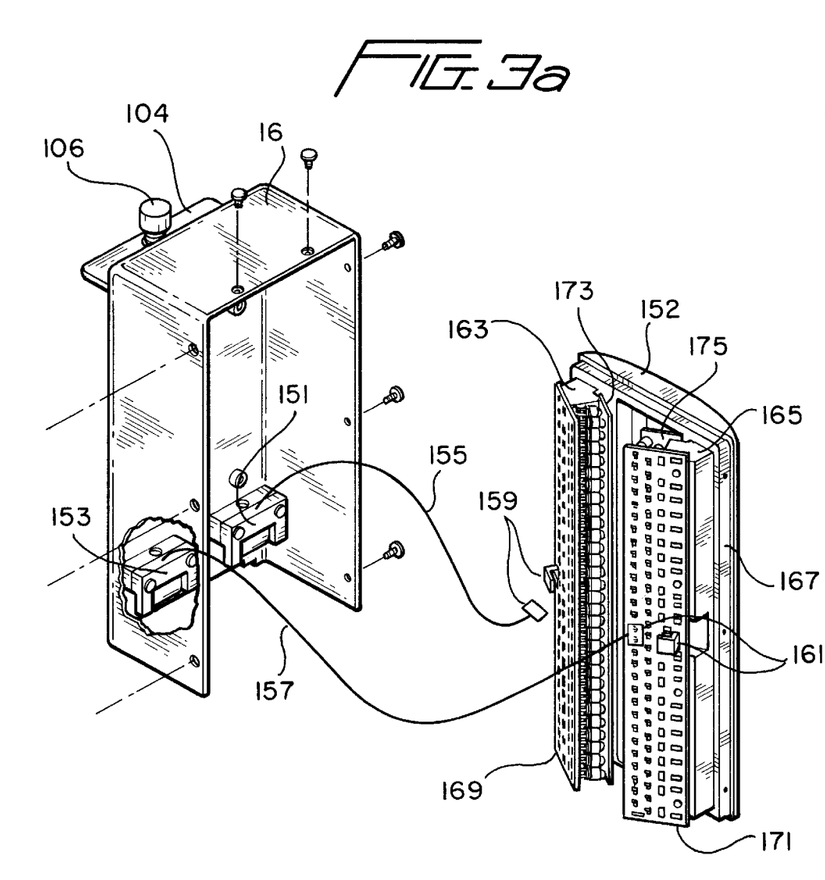
FIG. 3a is a partially exploded perspective view of the LED assemblies which are to be mounted within the front housing section of the new and improved line scan camera.

Having described the structural components of the line scan camera 10 of the present invention which enable the positional adjustment or calibration of the lens assembly 109 with respect to the metal heat sink 124, and therefore with respect to the printed circuit board 126 and the charge-coupled device 127 mounted thereon, a description will now be provided in connection with the positional adjustment or calibration of the optical assembly 122 with respect to the object plane. As can best be seen or appreciated from FIGS. 1–3, the front housing section 16 has a cover member 152 fixedly mounted upon the front surface thereof, and the cover member 152 is provided with a vertically oriented window 154 within which a sapphire crystal 156 is secured, for example, by means of a compression fit within the cover member assembly 152. The sapphire crystal 156 therefore defines, in effect, an object plane across which objects, such as, for example, pieces of postal mail, are conveyed so as to be scanned or photographed by means of the line scan camera 10. The optical bench 12 further comprises a first pair or set of laterally or transversely spaced upstanding electrical connectors 158,160 mounted upon a forward region thereof, and each one of the first pair or set of electrical connectors 158,160 is provided with an upstanding guide pin 162,164 for guided alignment with a second pair or set of electrical connectors 151,153 which are fixedly mounted within the front housing section 16, as best seen in FIG. 3a, such that the electrical connectors 151, 153 can be respectively electrically mated with the electrical connectors 158,160 when the front housing section 16 is vertically lowered onto the optical bench 12.

It is noted that the front housing section 16 further comprises a pair of white LED assemblies which are adapted to be electrically connected to the electrical connectors 151,153 through means of electrical wires 155,157 and pairs of plug connectors 159,161. The two white LED assemblies comprise a pair of vertically oriented mounting blocks 163,165 which are mounted upon a support wall 167 for cover member 152, and a pair of vertically oriented LED arrays 169,171 which are mounted upon angled rear surface portions of the mounting blocks 163,165. A pair of diffusers 173,175 are mounted upon angled front surface portions of the mounting blocks 163,165, and it is noted that the diffusers 173,175 are translucent and are fabricated from a suitable polycarbonate material. The surfaces of the diffusers are laser etched so as to have, in effect, a grainy texture which exhibits a matte finish or appearance whereby the light from the LED arrays 169,171 is effectively diffused or homogenized so that the light emitted by the individual LEDs of the LED arrays 169,171 is effectively formed into a uniform band of light as opposed to individual light loci. The LED arrays 169,171 thus provide the necessary illumination directed toward the window 154 and the crystal sapphire 156 so as to in fact illuminate the object plane across which the objects to be scanned and photographed are conveyed. Accordingly, proper illumination and exposure of the objects conveyed across the object plane is always ensured. It is additionally noted, as best seen in FIG. 2, that the offset vertical wall member 92 is provided with a vertically oriented window 166 which is effectively axially or optically aligned with the sapphire crystal 156 provided within the front cover 152 of the front housing section 16 such that the illuminated images of the objects conveyed across the object plane and past the sapphire crystal 156 are able to be optically transmitted through the central or intermediate housing section 20, to the lens component 110, and in turn, to the charge-coupled device 127 disposed upon the printed circuit board 126. It is also noted the use of LEDs, as opposed to the use of conventional halogen type lamps, also extends the life span or service life of the illumination source of the camera 10, again obviating frequent replacement of the camera illumination source.

Figure 4:
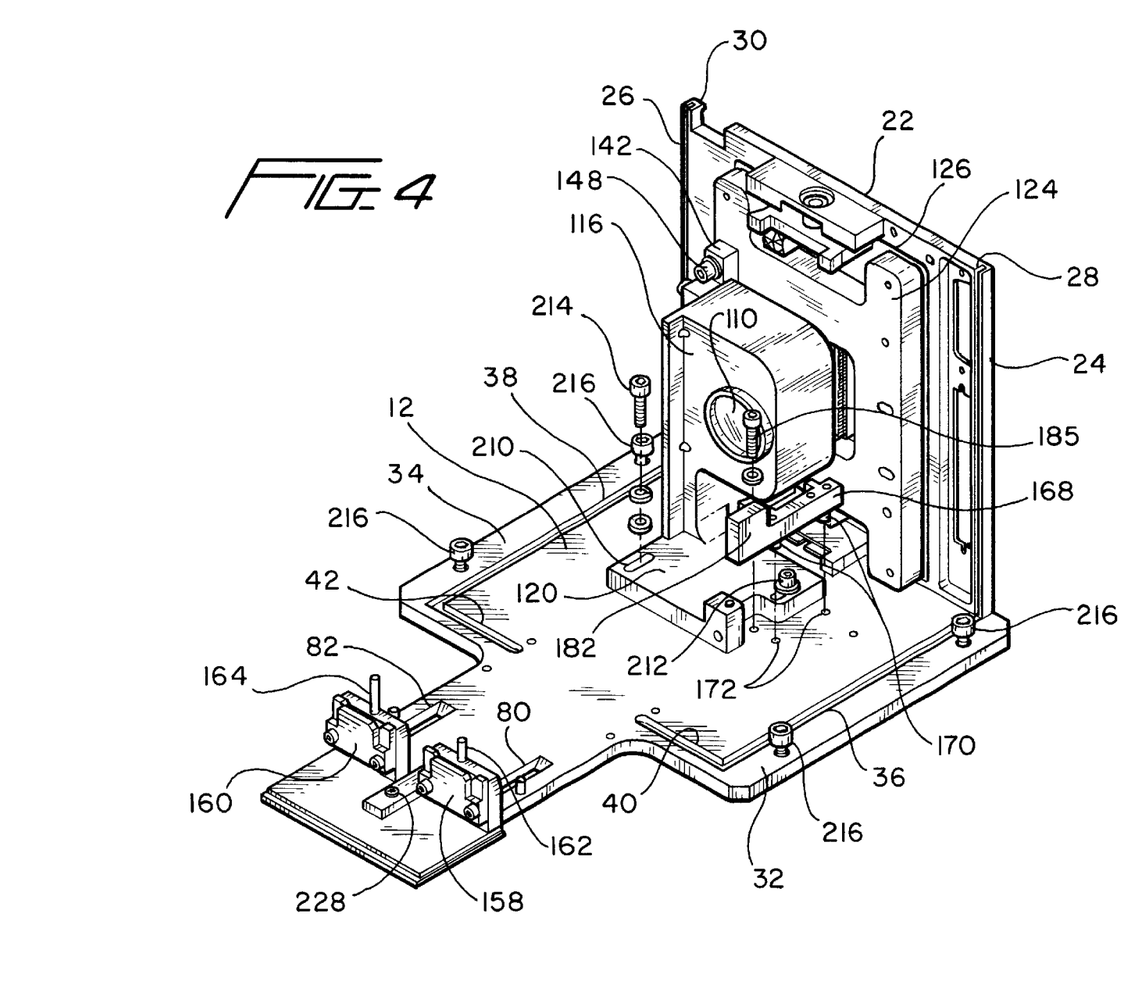
FIG. 4 is a partially exploded, right side, front perspective view of the optical assembly and optical bench components of the new and improved line scan camera constructed in accordance with the principles and teachings of the present invention and showing the cooperative parts thereof.
Figure 5:
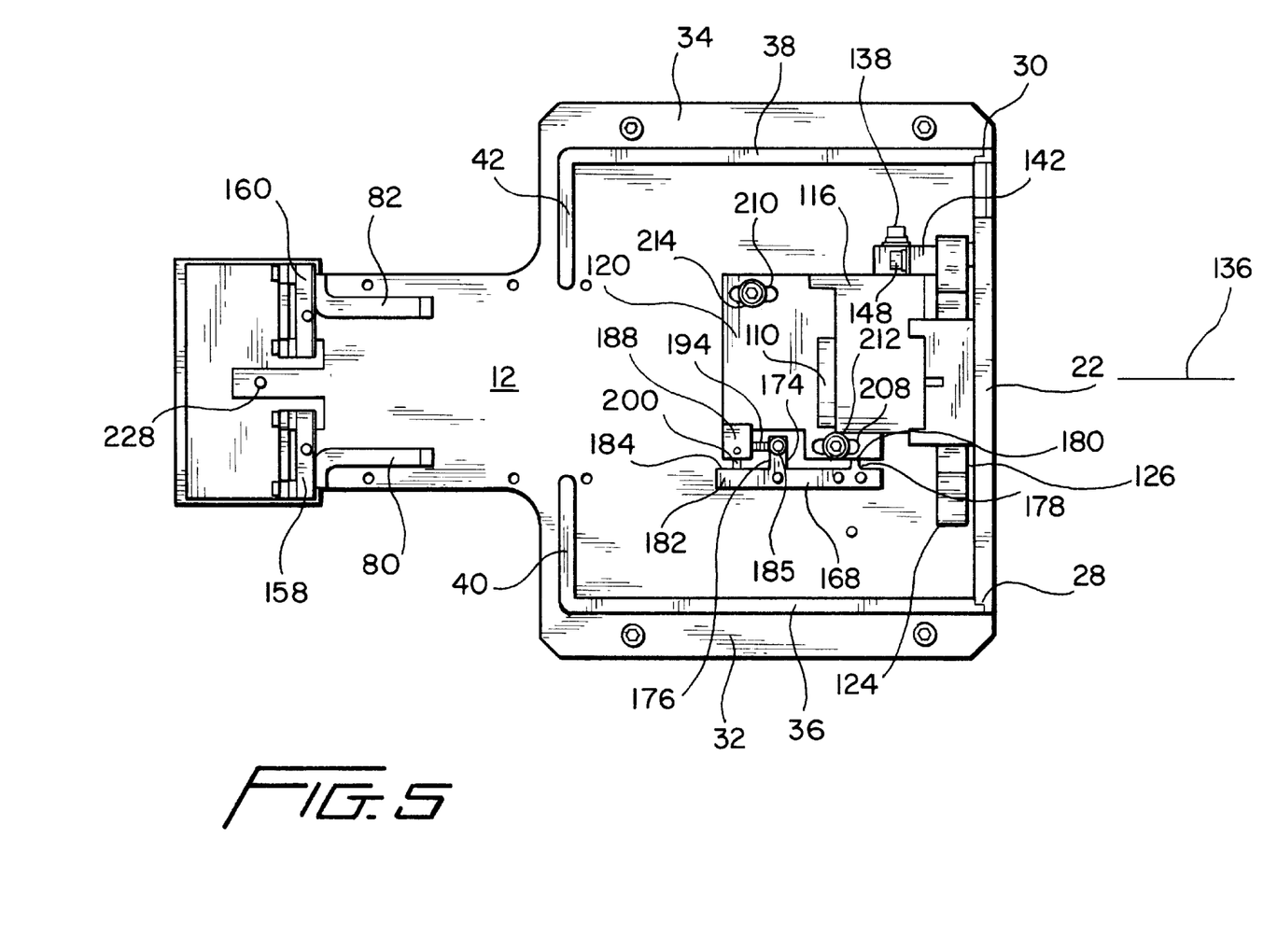
FIG. 5 is a top plan view of the optical assembly and optical bench components of the new and improved line scan camera constructed in accordance with the principles and teachings of the present invention and showing the cooperative parts thereof in their positions corresponding to those of FIG. 4.
Figure 6:
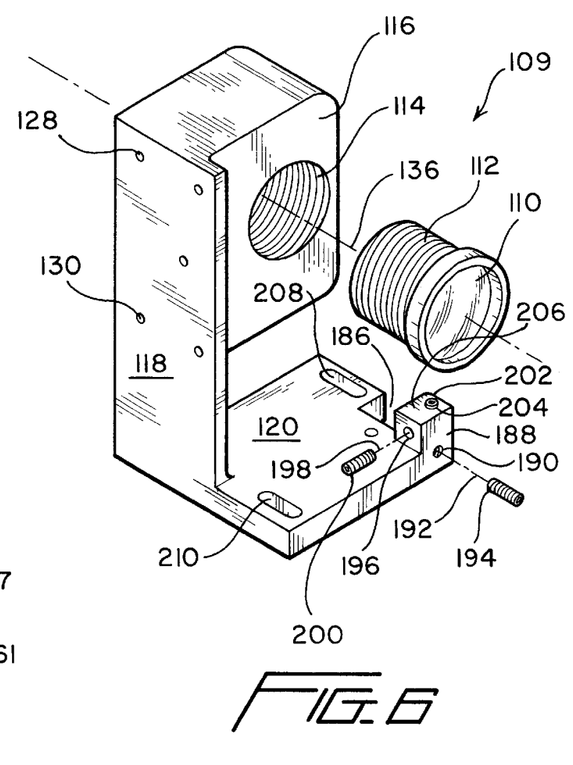
FIG. 6 is a partially exploded, left side, front perspective view of the lens assembly of the new and improved line scan camera constructed in accordance with the principles and teachings of the present invention.

In accordance with the unique calibration system constructed in accordance with the principles and teachings of the present invention in order to positionally adjust or calibrate the optical assembly 122, and more particularly, the lens component 110 thereof and the printed circuit board 126 containing the charge-coupled device 127, with respect to the object plane defined by means of the window 154 and sapphire crystal 156 respectively defined within and mounted upon the cover member 152 of the front housing section 16, a stop block 168, as best seen in FIGS. 4 and 5, is adapted to be fixedly mounted upon a substantially central region of that portion of the optical bench 12 upon which the rear housing section 18 is disposed. A pair of alignment pins 170 depend downwardly from the underside of the stop block 168, and a pair of apertures 172 are defined within the optical bench 12 for accommodating the alignment pins 170 whereby the stop block will be properly positioned upon the optical bench 12. The stop block 168 is seen to comprise a first relatively large horizontally disposed lug member 174 defining a first transversely oriented registration surface 176 as considered relative to the longitudinal axis 136, a second relatively small horizontally disposed lug member 178 defining a second axially oriented registration surface 180, and a third vertically oriented lug member 182 defining a third axially oriented registration surface 184. A vertically disposed bolt fastener 185, as seen in FIG. 4, fixes the stop block 168 upon the optical bench 12.

With particular reference now being additionally made to FIGS. 6–8, the lens assembly base 120 is seen to comprise a recessed region 186 and an upstanding lug 188 located within a corner region of the base 120 which is substantially diagonally opposite the lens assembly side wall 118. A first internally threaded bore 190 is provided within the lower portion of the upstanding lug 188 such that the axis 192 of the bore 190 is disposed parallel to the longitudinal axis 136 of the optical assembly 122, and for the purposes of the remaining discussion of the invention, axis 192 will be referred to as the x-axis. A first externally threaded set screw 194 is adapted to be inserted within the first internally threaded bore 190 such that the set screw 194 projects into the recessed region 186 as seen in FIG. 7. In a similar manner, a second internally threaded bore 196 is also provided within an upper portion of the upstanding lug 188, and it is noted that the axis 198 of the second bore 196 is disposed perpendicular to the axis 192 of the first bore 190 and will therefore be designated and referred to hereinafter as the y-axis. A second externally threaded set screw 200 is adapted to be inserted into the second internally threaded bore 196 and is adapted to project externally outwardly from a side face 202 of the upstanding lug 188 as also best seen in FIG. 7. A locking screw 204 is threadedly inserted into the top surface 206 of the upstanding lug 188 so as to be disposed within a vertical bore, not shown, whereby the locking screw 204 can engage the second set screw 200 so as to lock the same in position once the second set screw 200 has been positionally adjusted to a desired position for calibration purposes as will be described shortly hereafter. Another locking screw, not shown, and similar to locking screw 204, is preferably provided in connection with the first set screw 194 so as to likewise lock the same in position once the first set screw 194 has been positionally adjusted to a desired position for similar calibration purposes.

The lens assembly base 120 is lastly seen to further comprise a pair of oval shaped apertures or throughbores 208,210 which are located in diagonally opposite corner regions of the base 120, and a pair of bolt fasteners 212,214 are adapted to be disposed through the bores 208,210 so as to engage threaded bores, not shown, which are defined within the optical bench 12. In this manner, once the entire optical assembly 122 is positionally adjusted with respect to the optical bench 12 through means of the adjustment of the lens assembly base 120 as a result of the relative movement of the lens assembly base 120 with respect to the bolt fasteners 212,214, as permitted by the apertures 208,210, the disposition of the lens assembly base 120, and therefore that of the entire optical assembly 122, with respect to the optical bench 12, can be fixed as a result of the tightening of the bolt fasteners 212,214.

Having now described the various structural components of the present invention which enable the optical assembly 122 to be positionally adjusted or calibrated with respect to the object or focal plane as defined by means of the sapphire crystal 156, the actual positional adjustment or calibration of the optical assembly 122 with respect to the object or focal plane will now be described. Once the stop block 168 has been mounted and fixed upon the optical bench 12 by means of the alignment or guide pins 170 and the bolt fastener 185, the optical assembly 122 is then mounted upon the optical bench 12 as a result of being positioned with respect to the stop block 168 as shown in FIG. 5. More particularly, the first relatively large horizontally disposed lug member 174 is disposed within the recessed region 186 of the lens assembly base 120, and the portion of the lens assembly base 120 which is disposed within the region of the oval aperture 208 is seated upon or disposed against the second axially oriented registration surface 180. In addition, the first set screw 194 is seated upon or disposed against the first transversely oriented registration surface 176, and in a similar manner, the second set screw 200 is seated upon or disposed against the third axially oriented registration surface 184.

Accordingly, positional adjustments of the optical assembly 122 can be achieved along the x-axis parallel to the axis 136 by adjusting the set screw 194 with respect to the first registration surface 176 which effectively biases the lug member 188, and therefore the lens assembly base 120 and the entire optical assembly 122, in the x-axial direction toward or away from the object plane. It is to be noted that the x-axial adjustments also affect the magnification of the object with respect to the projection onto the chip or charge-coupled device 127, and that the object magnification, in turn, determines the resolution, as expressed in pixels per inch, of the camera assembly 10. In a similar manner, small positional adjustments of the optical assembly 122 can be performed along the y-axis perpendicular to the axis 136 by adjusting the set screw 200 with respect to the third registration surface 184 which effectively biases the lug member 188, and therefore the lens assembly base 120 and the entire optical assembly 122, in the y-axial direction. It is to be noted that adjustment of the set screw 200 with respect to registration surface 184 actually causes the lens assembly base 120 and the optical assembly 122 to yaw or pivot around the contact point defined between the lens assembly base 120 and the registration surface 180, or in other words, around, in effect, a z-axis which is perpendicular to a plane formed by means of the aforenoted orthogonal x and y axes 192,198.

Once such positional adjustments have been made as desired so as to properly, in effect, adjust the focus and magnification of the lens assembly 109, and the overall optical assembly 122, with respect to the object plane, the set screws 194,200 are locked in position by means of their respective locking screws 204, and subsequently, the disposition of the lens assembly base 120 is then locked or fixed upon the optical bench 12 by means of the tightening of the bolt fasteners 212,214.

It is therefore to be appreciated that once the disposition of the optical assembly 122 has been positionally adjusted or calibrated, further positional adjustments or calibrations need not be performed. Still further, should the optical assembly 122 be disassembled from the optical bench 12 by removing the bolt fasteners 212,214 so as to permit cleaning, maintenance or the like, to be performed upon the various components of the camera, when the optical assembly 122 is subsequently re-assembled upon the optical bench 12, no additional positional adjustments or calibrations need to be performed because, again, the relative disposition of the optical assembly 122 will be ensured by means of the fixed set screws 194,200 when the same are engaged or disposed in contact with their respective registration surfaces 176,184 of the stop block lugs 174,182, as well as the engagement of the lens assembly base 120 with the registration surface 180 of the stop block lug 178. It is noted still further, as has been alluded to hereinbefore, that similar adjustments to the lens assembly 109, and therefore in particular the lens component 110, with respect to the metal heat sink 124 and the printed circuit board 126 upon which the charge-coupled device (CCD) 127 is mounted, can be achieved. Adjustments of the mounting bracket 132 as permitted by means of the apertures 146 with respect to the bolt fasteners 148,150 permits slight rotation of the lens assembly 109 around the x-axis 192, while adjustments of the mounting bracket 132 as permitted by means of the apertures 134 with respect to the bolt fasteners 138, 140 permits slight rotation of the lens assembly 109 around the y-axis 192.

It is lastly noted that in connection with the provision of the sealed housing enclosure 14, comprising the three housing sections 16,18,20, as a means for preventing the ingress or introduction of dust or other contaminants into the interior of the housing enclosure 14 such that the optical components are not contaminated or fouled, the line scan camera 10 of the present invention also comprises a means for introducing a positive pressure differential into the interior of the housing enclosure 14 whereby such dust or other contaminants are effectively continuously prevented from entering the enclosure 14. More particularly, as can be readily seen with reference being made to FIGS. 1,4,5, and 9, the base or optical bench 12 is adapted to be fixedly secured to a mounting plate 215 of, for example, a mail processing facility, by means of a plurality of bolt fasteners 216. An air hose 217 is adapted to be pneumatically connected to an aperture or bore 218 which is defined within an internally threaded fitting 220 which is fixedly disposed within the mounting plate 215 such that the fitting 220 can be threadedly connected to an externally threaded fitting 222 provided upon the end of the air line 217. A washer 224 is adapted to be disposed around the externally threaded fitting 222 and a gasket-type seal 226 is adapted to be affixed within an undersurface portion of the base or optical bench 12. In this manner, when the base or optical bench 12 is fixed to the mounting plate 215 by means of the bolt fasteners 216, the gasket seal 226 effectively forms a pressurized air chamber between the upper surface of the mounting plate 215 and the undersurface of the base or optical bench 12. An aperture or through-bore 228 is formed within a substantially forward portion of the base or optical bench 12, and in this manner, aperture or bore 228, which opens pneumatically into the interior of the line scan camera 10, is pneumatically connected to the air chamber defined by means of the gasket 226. Accordingly, the interior of the line scan camera 10 is provided with low-volume, low-pressure air so as to thereby define the aforenoted pressurized air differential between the interior of the line scan camera 10 and the ambient atmosphere external of the line scan camera 10. It is also noted that as a result of the foregoing structure, the line scan camera 10, through means of its base plate or optical bench 12 fastened to the mounting plate 215 by means of the bolt fasteners 216, can be disassembled and removed from the mounting plate 215 without disturbing or disassembling the air line 217.

Thus, it may be seen that in accordance with the teachings and principles of the present invention, a new and improved line scan camera has been developed wherein the lens component is simply mounted in a lens mount of an optical assembly which can be positionally adjusted or calibrated relative to an object plane whereby once positionally adjusted or calibrated, further positional adjustments or focusing operations need not be performed. The line scan camera also comprises a sealed enclosure, with a positive pressure differential, so as to prevent the ingress of dust and other contaminants whereby fouling or contamination of the internal optical components is effectively prevented or substantially reduced, and the housing enclosure also comprises self-contained illumination arrays whereby proper exposure of the object plane is always ensured.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A lens assembly for use in connection with a line scan camera for scanning objects conveyed past an object plane, comprising:

a lens mount including a base member;

a lens component fixedly mounted upon said lens mount;

calibration means mounted upon said base member of said lens mount for engaging fixed parts of a base member of the camera when said base member of said lens mount is mounted upon the base member of the camera so as to positionally adjust the disposition of said lens component with respect to the object plane of the camera; and means for mounting said base member of said lens mount in an adjustably fixed manner upon the base member of the camera so as to accommodate said positional adjustment of said base member of said lens mount with respect to the object plane by said calibration means, whereby once said calibration means have been calibrated, further calibration of said calibration means is not required in order to accurately position said lens component with respect to the object plane of the camera even if said lens mount is dismounted from the base member of the camera and subsequently remounted upon the base member of the camera.

2. The lens assembly as set forth in claim 1, wherein said means for mounting said base member of said lens mount in said adjustably fixed manner comprises:

a pair of elliptically shaped apertures defined within said base member of said lens mount; and a pair of bolt fasteners for passage through said elliptically shaped apertures and for engagement with the base member of the camera.

3. The lens assembly as set forth in claim 1, wherein:

said calibration means comprises a pair of set screws mounted upon said base member of said lens mount for positionally adjusting said base member of said lens mount along both x and y orthogonal axes.

4. The lens assembly as set forth in claim 3, further comprising:

locking screws for engaging said set screws so as to lock said set screws at predetermined calibrated positions.

5. The lens assembly as set forth in claim 1, wherein:

said lens mount comprises an internally threaded bore; and said lens component is mounted within an externally threaded casing for full threaded engagement within said internally threaded bore of said lens mount such that when said calibration means are properly calibrated, said lens component need not be focused with respect to the object plane of the camera.

6. An optical assembly for use in connection with a line scan camera for scanning objects conveyed past an object plane and for transmitting images of the objects onto a charge-coupled device, comprising:

a printed circuit board having a charge-coupled device operatively mounted thereon;

a lens mount including a base member;

a lens component fixedly mounted upon said lens mount;

first calibration operatively interconnecting said printed circuit board and said lens mount so as to positionally adjust the disposition of said lens component with respect to the charge-coupled device mounted upon said printed circuit board and thereby define the focus distance between said lens component and the charge-coupled device, whereby once said first calibration means have been calibrated, further calibration of said first calibration means is not required in order to accurately position said lens component with respect to the charge-coupled device in order to define said focus distance between said lens component and the charge-coupled device;

second calibration means mounted upon said base member of said lens mount for engaging fixed parts of a base member of the camera when said base member of said lens mount is mounted upon the base member of the camera so as to positionally adjust the disposition of said lens component and said printed circuit board, with the charge-coupled device mounted thereon, with respect to the object plane of the camera and thereby define the focal distance of the camera as defined between said lens component and the object plane of the camera; and means for mounting said base member of said lens mount in an adjustably fixed manner upon the base member of the camera so as to accommodate said positional adjustment of said base member of said lens mount with respect to the object plane by said second calibration means, whereby once said second calibration means have been calibrated, further calibration of said second calibration means is not required in order to accurately position said lens component and said printed circuit board, with the charge-coupled device mounted thereon, with respect to the object plane of the camera even if said lens mount and said printed circuit board are dismounted from the base member of the camera and subsequently remounted upon the base member of the camera.

7. The optical assembly as set forth in claim 6, wherein said means for mounting said base member of said lens mount in said adjustably fixed manner comprises:

a pair of elliptically shaped apertures defined within said base member of said lens mount; and a pair of bolt fasteners for passage through said elliptically shaped apertures and for engagement with the base member of the camera.

8. The optical assembly as set forth in claim 6, wherein said first calibration means comprises:

a mounting bracket for interconnecting said lens mount and said printed circuit board;

sets of elliptically-shaped apertures defined within said mounting bracket such that axes of said apertures are disposed along orthogonal x and y axes; and bolt fasteners disposed through said sets of elliptically-shaped apertures so as to angularly fix said lens mount and said printed circuit board at predetermined angular positions with respect to each other around said x and y axes.

9. The optical assembly as set forth in claim 6, wherein:

said second calibration means comprises a pair of set screws mounted upon said base member of said lens mount for positionally adjusting said base member of said lens mount along both x and y axes.

10. The optical assembly as set forth in claim 9, further comprising:

locking screws for engaging said set screws so as to lock said set screws at predetermined calibrated positions.

11. The optical assembly as set forth in claim 6, wherein:

said lens mount comprises an internally threaded bore; and said lens component is mounted within an externally threaded casing for full threaded engagement within said internally threaded bore of said lens mount such that when said first and second calibration means are properly calibrated, said lens component need not be focused with respect to the charge-coupled device and the object plane of the camera.

12. A line scan camera for scanning objects conveyed past an object plane and for transmitting images of the objects onto a charge-coupled device, comprising:

an optical bench;

a printed circuit board upon which a charge-coupled device is operatively mounted;

a lens mount including a base member;

a lens component fixedly mounted upon said lens mount;

first calibration means mounted upon said lens mount for operatively engaging said printed circuit board so as to positionally adjust the disposition of said lens component with respect to the charge-coupled device mounted upon said printed circuit board and thereby define the focus distance between said lens component and the charge-coupled device, whereby once said first calibration means have been calibrated, further calibration of said first calibration means is not required in order to accurately position said lens component with respect to the charge-coupled device in order to define said focus distance between said lens component and the charge-coupled device;

second calibration means mounted upon said base member of said lens mount for engaging fixed parts of said optical bench when said base member of said lens mount is mounted upon said optical bench so as to positionally adjust the disposition of said lens component and said printed circuit board, with the charge-coupled device mounted thereon, with respect to the object plane of the camera and thereby define the focal distance of the camera as defined between said lens component and the object plane of the camera; and means for mounting said base member of said lens mount in an adjustably fixed manner upon said optical bench so as to accommodate said positional adjustment of said base member of said lens mount with respect to the object plane by said second calibration means, whereby once said second calibration means have been calibrated, further calibration of said second calibration means is not required in order to accurately position said lens component and said printed circuit board, with the charge-coupled device mounted thereon, with respect to the object plane of the camera even if said lens mount and said printed circuit board are dismounted from said optical bench and subsequently remounted upon said optical bench.

13. The line scan camera as set forth in claim 12, wherein said means for mounting said base member of said lens mount in said adjustably fixed manner comprises:

a pair of elliptically shaped apertures defined within said base member of said lens mount; and a pair of bolt fasteners for passage through said elliptically shaped apertures and for engagement with said optical bench of said camera.

14. The line scan camera as set forth in claim 12, wherein said first calibration means comprises:

a mounting bracket for interconnecting said lens mount and said printed circuit board;

sets of elliptically-shaped apertures defined within said mounting bracket such that axes of said apertures are disposed along orthogonal x and y axes; and bolt fasteners disposed through said sets of elliptically-shaped apertures so as to angularly fix said lens mount and said printed circuit board at predetermined angular positions with respect to each other around said x and y axes.

15. The line scan camera as set forth in claim 12, wherein:

a stop block is fixedly mounted upon said optical bench;

said fixed parts of said optical bench comprise lug members formed upon said stop block; and said second calibration means comprises a pair of set screws mounted upon said base member of said lens mount for engaging said lug members of said stop block so as to positionally adjust said base member of said lens mount along both x and y axes.

16. The line scan camera as set forth in claim 15, further comprising:

locking screws for engaging said set screws so as to lock said set screws at predetermined calibrated positions.

17. The line scan camera as set forth in claim 12, wherein:

said lens mount comprises an internally threaded bore; and said lens component is mounted within an externally threaded casing for full threaded engagement within said internally threaded bore of said lens mount such that when said first and second calibration means are properly calibrated, said lens component need not be focused with respect to the charge-coupled device and the object plane of the camera.

18. A line scan camera for scanning objects conveyed past an object plane and for transmitting images of the objects onto a charge-coupled device, comprising:

a housing having a window mounted within a forward section of said housing and defining an object plane past which objects to be scanned and photographed are conveyed;

a printed circuit board, upon which a charge-coupled device is mounted, disposed within a rearward section of said housing;

a lens mount disposed within said housing;

a lens component fixedly mounted upon said lens mount and interposed between said object plane and said printed circuit board, upon which the charge-coupled device is mounted, for transmitting images of the objects conveyed past said object plane to the charge-coupled device mounted upon said printed circuit board; and adjustable calibration means for fixing the positional location of said lens component with respect to both said printed circuit board, and the charge-coupled device mounted thereon, and said object plane so as to fixedly determine the focus distance defined between said lens component and the charge-coupled device mounted upon said printed circuit board, and the focal distance defined between said lens component and said object plane, whereby once said calibration means have been calibrated, further calibration of said calibration means is not required in order to accurately position said lens component with respect to said printed circuit board, with the charge-coupled device mounted thereon, so as to ensure accurate definition of said focus distance, and with respect to the object plane of the camera so as to ensure accurate definition of said focal distance.

19. The line scan camera as set forth in claim 18, further comprising:

an optical bench disposed within said housing; and means for mounting a base member of said lens mount in an adjustably fixed manner upon said optical bench so as to accommodate said positional adjustment of said base member of said lens mount with respect to the object plane by said adjustable calibration means.

20. The line scan camera as set forth in claim 19, wherein said means for mounting said base member of said lens mount in said adjustably fixed manner comprises:

a pair of elliptically shaped apertures defined within said base member of said lens mount; and a pair of bolt fasteners for passage through said elliptically shaped apertures and for engagement with said optical bench of said camera.

21. The line scan camera as set forth in claim 19, wherein:

said housing comprises three interconnected housing sections mounted upon said optical bench.

22. The line scan camera as set forth in claim 19, further comprising:

electrical connector means mounted upon said optical bench for connection to LED arrays for illuminating objects conveyed past said window defining said object plane so as to always ensure proper exposure of the objects conveyed past said window.

23. The line scan camera as set forth in claim 19, wherein said adjustable calibration means comprises:

first adjustable calibrating means comprising a mounting bracket for interconnecting said lens mount and said printed circuit board; sets of elliptically-shaped apertures defined within said mounting bracket such that axes of said apertures are disposed along orthogonal x and y axes; and bolt fasteners disposed through said sets of elliptically-shaped apertures so as to angularly fix said lens mount and said printed circuit board at predetermined angular positions with respect to each other around said x and y axes; and second calibration means comprising a stop block fixedly mounted upon said optical bench; lug members formed upon said stop block; and a pair of set screws mounted upon said base member of said lens mount for engaging said lug members of said stop block so as to positionally adjust said base member of said lens mount along both x and y orthogonal axes.

24. The line scan camera as set forth in claim 23, further comprising:

locking screws for engaging said set screws so as to lock said set screws at predetermined calibrated positions.

25. The line scan camera as set forth in claim 18, wherein:

a sapphire crystal is disposed within said window of said housing so as to define said object plane.

26. The line scan camera as set forth in claim 18, wherein:

said lens mount comprises an internally threaded bore; and said lens component is mounted within an externally threaded casing for full threaded engagement within said internally threaded bore of said lens mount such that when said calibration means are properly calibrated, said lens component need not be focused with respect to the charge-coupled device and the object plane of the camera.

\* \* \* \* \*